US012033474B2

(12) United States Patent
Visser et al.

(10) Patent No.: US 12,033,474 B2
(45) Date of Patent: *Jul. 9, 2024

(54) SYSTEMS AND METHODS OF ELECTRONIC GAMING FOR INCREMENTING A NUMBER OF FREE GAMES ASSOCIATED WITH A FEATURE GAME

(71) Applicant: Aristocrat Technologies Australia Pty Limited, North Ryde (AU)

(72) Inventors: Antoon Christiaan Visser, Coogee (AU); Claudia Rae, Waitara (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/957,727

(22) Filed: Sep. 30, 2022

(65) Prior Publication Data

US 2023/0023103 A1 Jan. 26, 2023

Related U.S. Application Data

(63) Continuation of application No. 16/415,459, filed on May 17, 2019, now Pat. No. 11,475,735.

(30) Foreign Application Priority Data

May 21, 2018 (AU) ................................ 2018203549

(51) Int. Cl.
*G07F 17/34* (2006.01)
*G07F 17/32* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/3267; G07F 17/3213; G07F 17/34
(Continued)

(56) References Cited

U.S. PATENT DOCUMENTS

D423,483 S 4/2000 Hodgson
6,491,584 B2 12/2002 Graham
(Continued)

OTHER PUBLICATIONS

Australian Examination Report No. 1 for App. No. AU2022200049, dated Feb. 22, 2023, 1-3 pages.
(Continued)

*Primary Examiner* — Jay Trent Liddle
*Assistant Examiner* — Ryan Hsu
(74) *Attorney, Agent, or Firm* — Armstrong Teasdale LLP

(57) ABSTRACT

An electronic gaming machine includes a display device and a processor configured to execute instructions stored in a memory, which when executed by the processor, cause the processor to at least initiate a base game that displays a plurality of symbols across a plurality of rows, and evaluate the plurality of symbols displayed in the plurality of rows to determine an outcome of the base game. The instructions also cause the processor to determine whether an accumulation condition is satisfied based on the plurality of symbols displayed during the base game, and in response to the accumulation condition being satisfied, increment at least one free game meter of a plurality of free game meters stored in the memory. Each free game meter of the plurality of free game meters is associated with one feature game of a plurality of feature games, and each free game meter stores a number of free games that will be awarded to a player of the electronic gaming machine when the feature game associated with the free game meter is triggered from the base game.

20 Claims, 10 Drawing Sheets

(58) Field of Classification Search
USPC .......................................................... 463/20
See application file for complete search history.

(56) References Cited

U.S. PATENT DOCUMENTS

| | | | |
|---|---|---|---|
| 6,604,740 | B1 | 8/2003 | Singer |
| D479,531 | S | 9/2003 | Yanagida |
| D519,515 | S | 4/2006 | Mugura |
| 7,070,501 | B2 | 7/2006 | Cormack |
| D544,871 | S | 6/2007 | Lim |
| 7,326,109 | B2 | 2/2008 | Baerlocher |
| 7,559,837 | B1 | 7/2009 | Yoseloff |
| D603,416 | S | 11/2009 | Poling |
| 7,632,184 | B2 | 12/2009 | Gauselmann |
| 7,675,514 | B2 | 3/2010 | Ni |
| 7,758,414 | B1 | 7/2010 | Marks |
| D622,283 | S | 8/2010 | Van Os |
| 7,874,915 | B2 | 1/2011 | Caspers |
| D648,735 | S | 11/2011 | Arnold |
| 8,231,456 | B2 | 7/2012 | Zielinski |
| D664,992 | S | 8/2012 | Pizzutelli |
| D665,418 | S | 8/2012 | Pizzutelli |
| D665,419 | S | 8/2012 | Pizzutelli |
| 8,298,070 | B2 | 10/2012 | Kato |
| 8,360,851 | B2 | 1/2013 | Aoki |
| 8,460,094 | B2 | 6/2013 | Bigelow, Jr. |
| 8,491,390 | B2 | 7/2013 | Cregan |
| D687,449 | S | 8/2013 | Van Os |
| 8,562,418 | B2 | 10/2013 | Gomez |
| D695,755 | S | 12/2013 | Hwang |
| 8,608,539 | B2 | 12/2013 | Itagaki |
| 8,690,659 | B2 | 4/2014 | Moody |
| 8,702,489 | B2 | 4/2014 | Cuddy |
| D709,515 | S | 7/2014 | Elston |
| D715,827 | S | 10/2014 | Lacour |
| D717,826 | S | 11/2014 | Lacour |
| D718,331 | S | 11/2014 | Lacour |
| D744,509 | S | 12/2015 | Moriya |
| D745,036 | S | 12/2015 | Joynes |
| D746,294 | S | 12/2015 | Jung |
| 9,202,337 | B2 | 12/2015 | Lee |
| 9,240,105 | B2 | 1/2016 | Kadlec |
| D750,097 | S | 2/2016 | Kim |
| D751,111 | S | 3/2016 | Zhou |
| D752,091 | S | 3/2016 | Zhou |
| D754,154 | S | 4/2016 | Moon |
| D754,155 | S | 4/2016 | Moon |
| D760,739 | S | 7/2016 | Jung |
| D761,300 | S | 7/2016 | Haitani |
| D761,802 | S | 7/2016 | Moon |
| D761,845 | S | 7/2016 | Haitani |
| 9,396,616 | B2 | 7/2016 | Baerlocher |
| D763,305 | S | 8/2016 | Hashimoto |
| D763,867 | S | 8/2016 | Moon |
| D766,943 | S | 9/2016 | Moriya |
| D771,075 | S | 11/2016 | Moriya |
| D775,157 | S | 12/2016 | Perach |
| D775,648 | S | 1/2017 | Snell |
| D776,694 | S | 1/2017 | Kim |
| 9,536,392 | B1 | 1/2017 | Luciano, Jr. |
| D791,802 | S | 7/2017 | Solop |
| D805,529 | S | 12/2017 | Hersh |
| 9,836,917 | B2 | 12/2017 | Bennett |
| D810,767 | S | 2/2018 | Sharma |
| D813,880 | S | 3/2018 | Davis |
| D813,881 | S | 3/2018 | Davis |
| D823,877 | S | 7/2018 | Ludwick |
| 10,147,264 | B1 | 12/2018 | Halvorson |
| D837,828 | S | 1/2019 | Gros |
| D847,172 | S | 4/2019 | Nishiura |
| 10,262,501 | B2 | 4/2019 | Satterlie |
| D847,834 | S | 5/2019 | Toth |
| D869,483 | S | 12/2019 | Wilde |
| D875,109 | S | 2/2020 | Upton |
| D881,223 | S | 4/2020 | Tuomey |
| D890,192 | S | 7/2020 | Cortesi |
| 10,733,846 | B2 | 8/2020 | Wright |
| D895,645 | S | 9/2020 | Sanborn |
| D896,235 | S | 9/2020 | Tedesco |
| 10,818,145 | B2 | 10/2020 | Kendall |
| D904,452 | S | 12/2020 | Kroon |
| D905,095 | S | 12/2020 | Park |
| 10,896,567 | B2 | 1/2021 | Rizos |
| D912,158 | S | 3/2021 | Marks |
| D914,051 | S | 3/2021 | Paul |
| D940,177 | S | 1/2022 | Tuomey |
| D942,466 | S | 2/2022 | Degens |
| 2005/0070354 | A1 | 3/2005 | Baerlocher |
| 2005/0075163 | A1 | 4/2005 | Cuddy |
| 2007/0060321 | A1 | 3/2007 | Vasquez |
| 2007/0184887 | A1 | 8/2007 | Cannon |
| 2007/0213114 | A1 | 9/2007 | Caspers |
| 2008/0026822 | A1 | 1/2008 | Walker |
| 2008/0076513 | A1 | 3/2008 | Esses |
| 2008/0113779 | A1 | 5/2008 | Cregan |
| 2009/0061985 | A1 | 3/2009 | Inamura |
| 2009/0104977 | A1 | 4/2009 | Zielinski |
| 2009/0104986 | A1 * | 4/2009 | Englman ............. G07F 17/3258 463/27 |
| 2010/0016061 | A1 | 1/2010 | Gomez |
| 2010/0029381 | A1 * | 2/2010 | Vancura .............. G07F 17/3244 463/30 |
| 2010/0120495 | A1 | 5/2010 | Frank |
| 2010/0120499 | A1 | 5/2010 | Cohen |
| 2010/0234089 | A1 | 9/2010 | Saffari |
| 2010/0234091 | A1 | 9/2010 | Baerlocher |
| 2011/0003636 | A1 | 1/2011 | Thomas |
| 2011/0105216 | A1 | 5/2011 | Cohen |
| 2011/0107223 | A1 | 5/2011 | Tilton |
| 2011/0118010 | A1 | 5/2011 | Brune |
| 2011/0130191 | A1 | 6/2011 | Englman |
| 2011/0136562 | A1 | 6/2011 | Loat |
| 2011/0263317 | A1 | 10/2011 | Marks |
| 2012/0289325 | A1 * | 11/2012 | Kyte .................. G07F 17/3258 463/27 |
| 2012/0289326 | A1 | 11/2012 | Englman |
| 2013/0065663 | A1 | 3/2013 | Johnson |
| 2013/0159928 | A1 | 6/2013 | Joynes |
| 2013/0252704 | A1 | 9/2013 | Gilbertson |
| 2013/0260864 | A1 | 10/2013 | Gomez |
| 2013/0273997 | A1 | 10/2013 | Stewart |
| 2013/0310157 | A1 | 11/2013 | Baerlocher |
| 2014/0040810 | A1 | 2/2014 | George |
| 2014/0051494 | A1 | 2/2014 | Marks |
| 2014/0051496 | A1 | 2/2014 | Meyer |
| 2014/0059490 | A1 | 2/2014 | Grace |
| 2014/0094256 | A1 | 4/2014 | Hilbert |
| 2014/0094271 | A1 | 4/2014 | Wabschall |
| 2014/0137020 | A1 | 5/2014 | Sharma |
| 2014/0141866 | A1 | 5/2014 | Irwin, Jr. |
| 2014/0162751 | A1 | 6/2014 | Ryan |
| 2014/0274348 | A1 | 9/2014 | Baerlocher |
| 2014/0323198 | A1 | 10/2014 | Tuck |
| 2014/0349734 | A1 | 11/2014 | Saunders |
| 2015/0018070 | A1 | 1/2015 | Meyer |
| 2015/0031444 | A1 | 1/2015 | Colvin |
| 2015/0080090 | A1 | 3/2015 | Nicely |
| 2015/0206397 | A1 | 7/2015 | Nelson |
| 2015/0248810 | A1 | 9/2015 | Wortmann |
| 2015/0262457 | A1 | 9/2015 | Jhanb |
| 2015/0287269 | A1 | 10/2015 | Berman |
| 2015/0310699 | A1 | 10/2015 | Meyer |
| 2015/0332560 | A1 | 11/2015 | Fulton |
| 2016/0042597 | A1 | 2/2016 | Olive |
| 2016/0253873 | A1 | 9/2016 | Olive |
| 2016/0328926 | A1 | 11/2016 | Boese |
| 2017/0032611 | A1 | 2/2017 | Luong |
| 2017/0053496 | A1 | 2/2017 | Borissov |
| 2017/0092066 | A1 | 3/2017 | Watkins |
| 2017/0148274 | A1 | 5/2017 | Olive |
| 2017/0154498 | A1 | 6/2017 | Olive |
| 2017/0301177 | A1 | 10/2017 | Pawloski |
| 2017/0309119 | A1 | 10/2017 | San |
| 2018/0082546 | A1 | 3/2018 | Mariscal |

(56) References Cited

U.S. PATENT DOCUMENTS

| | | | |
|---|---|---|---|
| 2018/0130286 | A1 | 5/2018 | Berman |
| 2018/0268659 | A1 | 9/2018 | Chesworth |
| 2019/0043313 | A1 | 2/2019 | Cong |
| 2019/0051096 | A1 | 2/2019 | San |
| 2019/0102986 | A1 | 4/2019 | Nelson |
| 2019/0355218 | A1 | 11/2019 | Visser |
| 2020/0074791 | A1 | 3/2020 | Uberuaga |
| 2021/0069594 | A1 | 3/2021 | Sensui |
| 2023/0018779 | A1 | 1/2023 | Xu |

OTHER PUBLICATIONS

Harley Davidson Slot Machine, https://www.youtube.com/watch?v=SFMgMDDwbOg.
Harley Davidson Slot Machine, https://www.youtube.com/watch?v=2obOXY-IV9U.
Office Action dated Sep. 25, 2020 for U.S. Appl. No. 16/566,446 (pp. 1-11).
Notice of Allowance dated Nov. 18, 2020 for U.S. Appl. No. 16/558,735 (pp. 1-7).
Office Action dated Dec. 3, 2020 for U.S. Appl. No. 16/539,749 (pp. 1-9).
Supplemental Notice of Allowability dated Jan. 25, 2021 for U.S. Appl. No. 16/558,735 (pp. 1-2).
Notice of Allowance dated Jan. 28, 2021 for U.S. Appl. No. 16/566,446 (pp. 1-9).
Office Action dated Aug. 5, 2020 for U.S. Appl. No. 16/558,735 (pp. 1-9).
Office Action dated Jun. 8, 2021 for U.S. Appl. No. 29/726,817 (pp. 1-10).
Notice of Allowance dated Feb. 24, 2021 for U.S. Appl. No. 16/558,735 (pp. 1-7).
Corrected Notice of Allowability dated Apr. 7, 2021 for U.S. Appl. No. 16/566,446 (pp. 1-2).
Office Action dated Apr. 15, 2021 for U.S. Appl. No. 29/662,088 (pp. 1-9).
Buffalo Diamond Slot Machine from Aristocrat, This Week in Gambling, dated Oct. 12, 2019, youtube.com [online]. Retrieved Apr. 10, 2021 from internet <URL:https://www.youtube.com/watch?v=se1ET2x989U> (Year: 2019).
Notice of Allowance dated May 7, 2021 for U.S. Appl. No. 16/539,749 (pp. 1-8).
Notice of Allowance dated May 27, 2021 for U.S. Appl. No. 16/558,735 (pp. 1-7).
Notice of Allowance dated May 28, 2021 for U.S. Appl. No. 29/662,088 (pp. 1-5).
Notice of Allowance dated Sep. 3, 2021 for U.S. Appl. No. 29/726,817 (pp. 1-7).
Office Action dated Jan. 7, 2021 for U.S. Appl. No. 16/415,459 (pp. 1-12).
Australian Examination Report No. 1 for App. No. AU2019268090, dated Jan. 6, 2021, 6 pages.
Office Action (Final Rejection) dated Jul. 28, 2021 for U.S. Appl. No. 16/415,459 (pp. 1-27).
Office Action (Notice of Allowance and Fees Due (PTOL-85)) dated Sep. 7, 2021 for U.S. Appl. No. 16/539,749 (pp. 1-7).
Office Action (Non-Final Rejection) dated Oct. 13, 2021 for U.S. Appl. No. 16/415,459 (pp. 1-10).
Office Action (Notice of Allowance and Fees Due (PTOL-85)) dated Feb. 2, 2022 for U.S. Appl. No. 16/539,749 (pp. 1-5).
Office Action (Final Rejection) dated Feb. 15, 2022 for U.S. Appl. No. 16/415,459 (pp. 1-9).
Office Action (Non-Final Rejection) dated Mar. 14, 2022 for U.S. Appl. No. 17/301,400 (pp. 1-6).
Office Action (Notice of Allowance and Fees Due (PTOL-85)) dated Apr. 14, 2022 for U.S. Appl. No. 17/301,400 (pp. 1-8).
Office Action dated May 5, 2022 for U.S. Appl. No. 29/794,637 (pp. 1-6).
Buffalo Diamond Slot Review—Aristocrat, dated Apr. 26, 2019, sitandgoplanet.com [online]. Retrieved May 2, 2022 from internet <URL: https://web.archive.org/web/20190426092058/https://www.sitandgoplanet.com/casino/buffalo-diamond.html> (Year: 2022).
Office Action (Notice of Allowance and Fees Due (PTOL-85)) dated Jun. 16, 2022 for U.S. Appl. No. 16/415,459 (pp. 1-7).
Notice of Allowance dated Jul. 24, 2023 for U.S. Appl. No. 29/817,828 (pp. 1-9).
Office Action (Non-Final Rejection) dated Sep. 29, 2023 for U.S. Appl. No. 17/305,995 (pp. 1-7).
Office Action (Non-Final Rejection) dated Dec. 21, 2023 for U.S. Appl. No. 17/719,579 (pp. 1-10).
Office Action (Notice of Allowance and Fees Due (PTOL-85)) dated Feb. 1, 2024 for U.S. Appl. No. 17/305,995 (pp. 1-7).
Office Action (Notice of Allowance and Fees Due (PTOL-85)) dated Feb. 14, 2024 for U.S. Appl. No. 17/305,995 (pp. 1-2).
*New Slot!* Harley Davidson Motor Cycles (IGT) Slot Machine Bonus, available at <https://www.youtube.com/watch?v=Gue2SsYiWH8>, Jul. 31, 2017.

* cited by examiner

| | Reel position | Reel 1 (421) | Reel 2 (422) | Reel 3 (423) | Reel 4 (424) | Reel 5 (425) |
|---|---|---|---|---|---|---|
| 401 → | 1 | Pic 1 | 10 | Pic 3 | Q | MAXI 433 |
| 402 → | 2 | Wild | Q | Trigger symbol 436 | A | 10 |
| 403 → | 3 | Trigger symbol 436 | K | 10 | 10 | MAXI 433 |
| 404 → | 4 | Q | A | Q | Pic 2 | MEGA 434 |
| 405 → | 5 | 10 | Pic 2 | K | J | A |
| 406 → | 6 | A | 9 | Pic 1 | Wild | MINI 432 |
| 407 → | 7 | Trigger symbol 436 | Wild | J | 9 | K |
| 408 → | 8 | A | Pic 3 | Trigger symbol 436 | 10 | MINI 432 |
| 409 → | 9 | Q | Q | 9 | A | 9 |
| 410 → | 10 | Trigger symbol 436 | 10 | Q | Q | Wild |
| 411 → | 11 | J | A | 10 | J | MEGA 434 |
| 412 → | 12 | 10 | Wild | Wild | K | Q |
| 413 → | 13 | Pic 3 | K | Trigger symbol 436 | Wild | ULTRA 435 |
| 414 → | 14 | Wild | J | A | Pic 3 | Wild |
| 415 → | 15 | 9 | 10 | Wild | Pic 1 | ULTRA 435 |

443 442 441

FIG. 4

SYSTEMS AND METHODS OF ELECTRONIC GAMING FOR INCREMENTING A NUMBER OF FREE GAMES ASSOCIATED WITH A FEATURE GAME

CROSS-REFERENCE TO RELATED APPLICATIONS

The present application is a continuation of U.S. patent application Ser. No. 16/415,459, filed May 17, 2019, which claims priority to Australian Patent Application No. 2018203549, filed on May 21, 2018, the disclosures of which are incorporated by reference herein in their entirety.

FIELD

The present application relates to systems and methods of electronic gaming, and more particularly, to systems and methods of electronic gaming, in which a number of free games associated with and provided in a feature game (or feature games) are incremented based upon one or more symbols occurring in a base game.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, an electronic gaming machine is provided. The electronic gaming machine includes a display device and a processor configured to execute instructions stored in a memory, which when executed by the processor, cause the processor to at least initiate a base game that displays a plurality of symbols across a plurality of rows, and evaluate the plurality of symbols displayed in the plurality of rows to determine an outcome of the base game. The instructions also cause the processor to determine whether an accumulation condition is satisfied based on the plurality of symbols displayed during the base game, and in response to the accumulation condition being satisfied, increment at least one free game meter of a plurality of free game meters stored in the memory. Each free game meter of the plurality of free game meters is associated with one feature game of a plurality of feature games, and each free game meter stores a number of free games that will be awarded to a player of the electronic gaming machine when the feature game associated with the free game meter is triggered from the base game.

In another aspect, an electronic gaming system is provided. The electronic gaming system includes at least one electronic gaming machine and a progressive system server communicatively coupled to the at least one electronic gaming machine, where the progressive system server includes a processor configured to execute instructions stored in a memory, which when executed, cause the processor to at least receive, from the at least one electronic gaming machine, data indicating that an accumulation condition was satisfied based upon an evaluation of a plurality of symbols displayed during a base game played on the at least one electronic gaming machine. The instructions also cause the processor to increment at least one free game meter of a plurality of free game meters stored in the memory of the progressive system server in response to the accumulation condition being satisfied. Each free game meter of the plurality of free game meters is associated with one feature game of a plurality of feature games, and each free game meter stores a number of free games that will be awarded to a player of the electronic gaming machine when the feature game associated with the free game meter is triggered from the base game.

In yet another aspect, a method for electronic gaming is provided. The method includes controlling, by a processor of an electronic gaming machine, a display device of the electronic gaming machine to display a plurality of rows including a plurality of symbols during a base game, and evaluating, by the processor, the plurality of symbols displayed in the plurality of rows to determine an outcome of the base game. The method also includes determining, by the processor, whether an accumulation condition is satisfied based on the plurality of symbols displayed during the base game, and in response to the accumulation condition being satisfied, incrementing, by the processor, at least one free game meter of a plurality of free game meters stored in the memory. Each free game meter of the plurality of free game meters is associated with one feature game of a plurality of feature games, and each free game meter stores a number of free games that will be awarded to a player of the electronic gaming machine when the feature game associated with the free game meter is triggered from the base game.

In one or more other aspects, a gaming system implements base games and feature games that are triggered in response to occurrence of trigger conditions in the base games. One or more jackpot features are provided that provide a player with a number of free games, and each jackpot feature has an associated free game meter that maintains a cumulative record of the number of free games that are available in the feature game, the cumulative record increasing each time a defined outcome occurs in a base game. When a jackpot feature is triggered, several free games are provided to the player according to the number of free games recorded in the free game meter for the jackpot feature. The free games provided in at least one jackpot feature include more rows of displayed symbols than are provided in the base game.

In at least one implementation, multiple jackpot features are provided, with each jackpot feature including a dedicated free game meter and the number of rows of displayed symbols provided for each jackpot feature during free games being different. For example, the jackpot features may have different levels with the number of rows increasing with increasing jackpot feature level. Higher jackpot feature levels tend to be less likely triggered.

A gaming system is also described that comprises a base game implementer arranged to implement a base game having a number of rows of displayed symbols, and at least one free game meter arranged to record a free game value indicative of the number of free games available in a feature game. The system also includes an accumulation condition determiner arranged to determine whether an accumulation condition exists in an outcome of a base game, and a free game meter incrementor arranged to increment a free game meter of multiple free game meters by at least one free game when the accumulation condition determiner determines that an accumulation condition exists in an outcome of the base game, each feature game having an associated different free game meter. A trigger condition determiner is arranged to cause the gaming system to implement a feature game of a plurality of feature games when a feature trigger condition exists in an outcome of the base game. Each feature game includes a number of free games determined according to a respective one of the multiple free game meters. The feature game includes a number of symbol rows that is at least one symbol row more than the number of symbol rows of the base game and at least one symbol row more than the number of symbol rows of another feature game.

A method of gaming is also described that comprises implementing a base game having a defined number of rows of displayed symbols, recording a free game value indicative of the number of free games available in a feature game in at least one free game meter, and determining whether an accumulation condition exists in an outcome of a base game. The method also includes incrementing a free game meter of multiple free game meters by at least one free game when the accumulation condition determiner determines that an accumulation condition exists in an outcome of the base game, and causing the gaming system to implement a feature game of a plurality of feature games when a feature trigger condition exists in an outcome of the base game, each feature game including a number of free games determined according to a respective one of the multiple free game meters, each feature game associated with a different free game meter. At least one feature game includes in a free game of the feature game a number of symbol rows that is at least one symbol row more than the defined number of symbol rows of the base game and at least one symbol row more than the number of symbol rows of a free game of another feature game.

BRIEF DESCRIPTION OF THE DRAWINGS

FIG. 4 illustrates an example reel strip layout.

DETAILED DESCRIPTION

Systems and methods of electronic gaming are described, in which one or more feature games (e.g., one or more jackpot games) are associated with and can be won using one or more free spins accumulated during a base game. To this end, each time an accumulation symbol occurs in the base game, a free spin meter of an associated feature game may be incremented to increase the number of free spins associated with the free game. When a feature game is triggered (e.g., by a trigger symbol or symbols occurring in the base game), the player may be provided an expanded number of rows from a plurality of reels to play for an award associated with the triggered feature game. In some embodiments, the player may use the number of free spins specified for the feature game to play for the feature game award.

Figure 1:
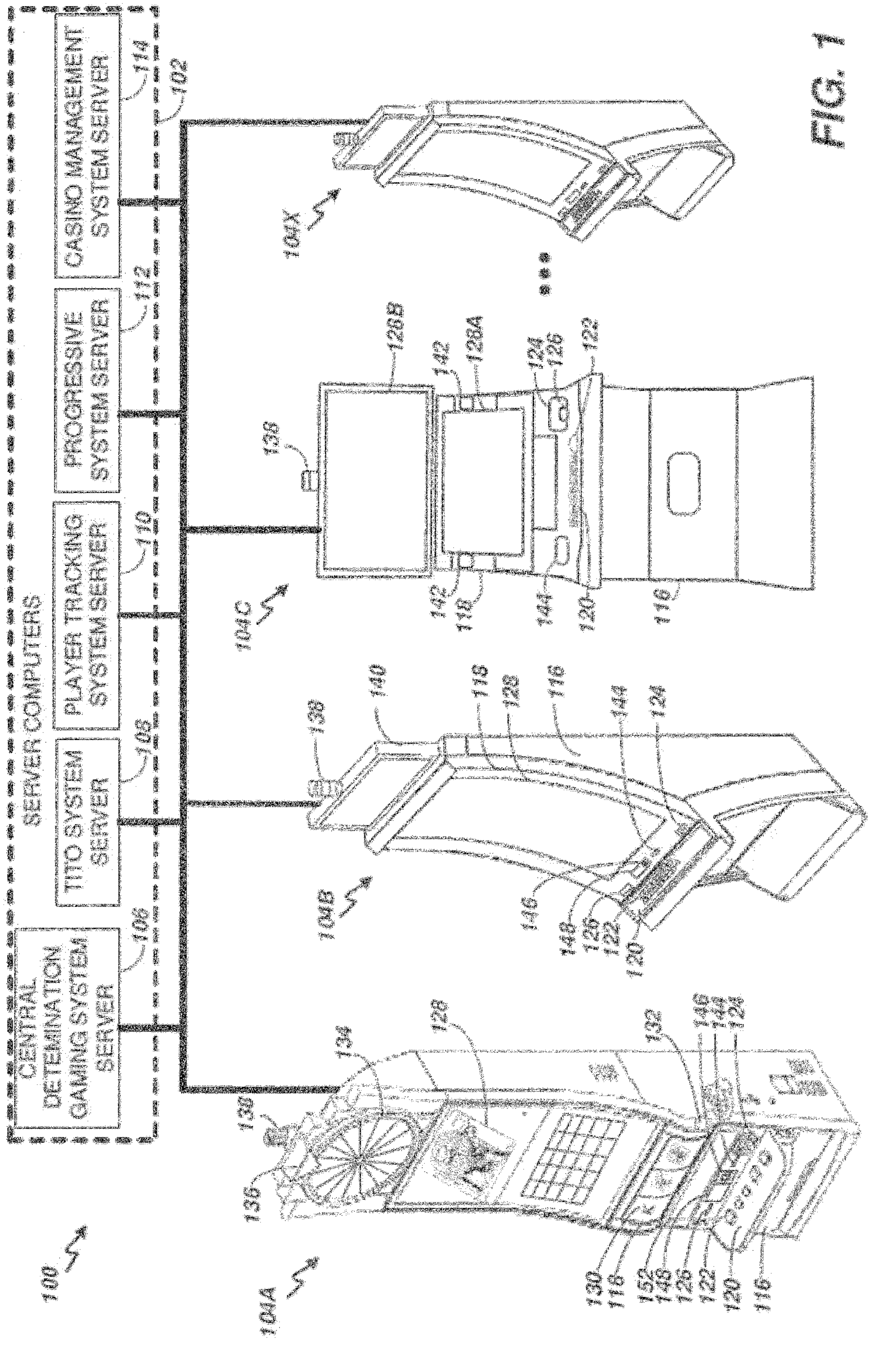
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
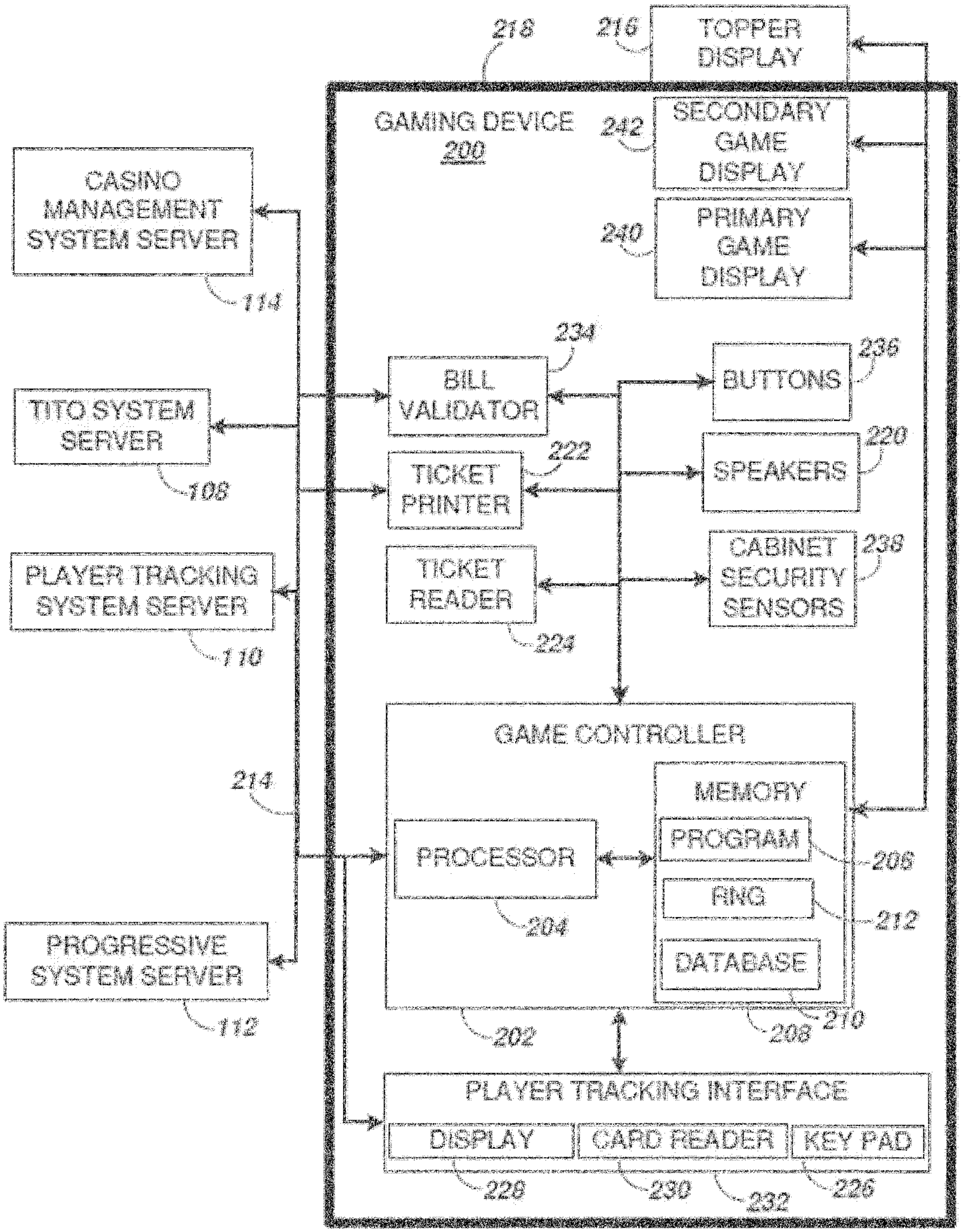
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
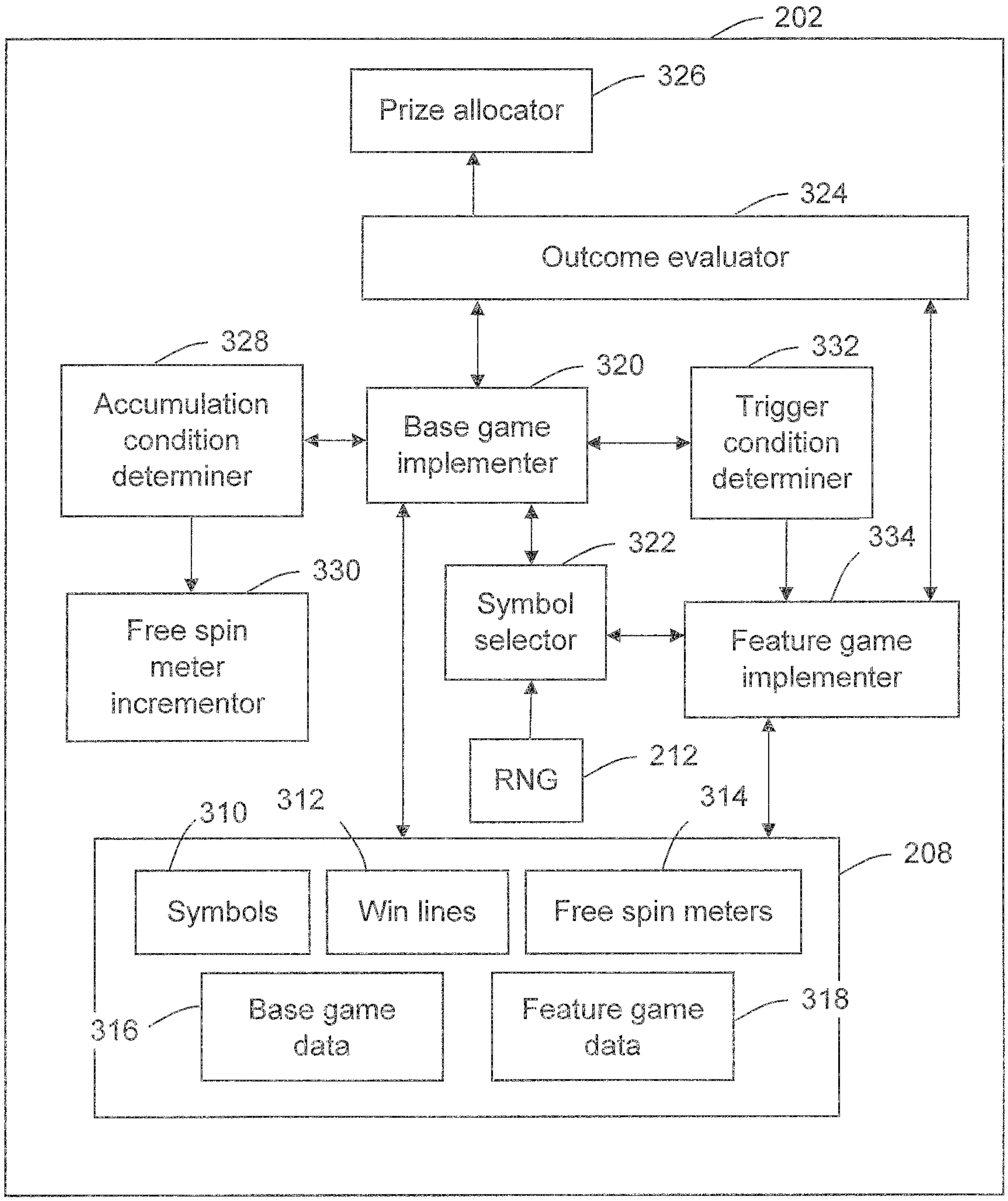
FIG. 3 is a block diagram showing functional components implemented by a game controller.

FIG. 3. Illustrates a block diagram showing functional components implemented by the game controller 202. In this example, the functional components comprise data stored in the memory 208, including data indicative of symbols 310, data indicative of win lines 312, free game meter data 314 indicative of the current total of free games in each of a plurality of free game meters associated with jackpot features, base game data 316 that defines characteristics of a base game, and feature game data 318 that defines characteristics of the jackpot features. The current number of free games in each free game meter corresponds to the number of feature games in a jackpot feature that will be available to a player if the jackpot feature is triggered during play of a base game by the player.

The functional components also include a base game implementer 320 arranged to implement a base game using the stored base game data 316, the base game implementer 320 using a symbol selector 322 to select symbols according to symbols data 310 for display at a plurality of display positions, for example using the random number generator 212. Outcomes of a base game are determined by an outcome evaluator 324 and any applicable prize is awarded by a prize allocator 326.

During implementation of a base game, an accumulation condition determiner 328 makes a determination based on the outcome of a base game as to whether to add one or more free games to any one of the free game meters 314, and based on the determination one or more free games may be added to the free game meters 314 by a free game meter incrementor 330. For example, a free game may be added to a free game meter when a defined symbol or combination of symbols is selected and displayed during a base game. With this example, each jackpot associated with a free game meter 314 may have a different defined symbol such that display of a defined symbol causes a free game to be added to a specific one of the free game meters 314. Display of multiple defined symbols causes multiple free games to be added according to the number of specific symbols displayed and the type of defined symbol displayed.

In one embodiment, the accumulation condition determiner 328 makes a determination based on the outcome of a base game implemented on the gaming device 200 such that only outcomes occurring on the gaming device 200 are used to add free games to the free game meters 314 of the gaming device 200.

Alternatively, a jackpot feature may be of multi-gaming device linked progressive type, for example managed by the progressive system server 112. With this arrangement, each gaming device associated with the progressive jackpot managed by the progressive system server 112 contributes to a free game meter stored at the progressive system server 112, for example when a defined symbol or combination of symbols is selected and displayed during a base game on any of the gaming devices associated with the linked progressive jackpot.

The functional components also include a trigger condition determiner 332 arranged to make a determination based on the outcome of a base game as to whether to commence a jackpot feature, and a feature game implementer 334 arranged to implement a jackpot feature using the stored feature game data 318 using a symbol selector 322 to select symbols for display at a plurality of display positions, for example using the random number generator 112. Outcomes of a feature game in a jackpot feature are determined by the outcome evaluator 324 and any applicable prize is awarded by a prize allocator 326. For example, a jackpot feature may be triggered by selection and display of at least one defined symbol, and in one example a jackpot feature is triggered by selection and display of at least one defined symbol at defined positions in a display area, and the specific jackpot feature to be implemented is determined according to the type of defined symbol that is displayed at a defined position on the display area.

Those skilled in the art will appreciate that the systems and methods described in the present disclosure allow a player to accumulate equity in the play of the game described in various embodiments herein. Incrementing a free game meter for one or more feature games as the player is playing the game increases the equity or player investment in the game, i.e., the perception to the player that the free game with an increased number of free spins will have a higher payout than a free game with a lower number of free spins. As the player increases the free spins of a free game meter, the expectation that the free game will have a higher payout increases for the player. This causes the player to make a decision when thinking about ending a gaming session based on the accumulated spins in the free game meter. Some players may wish to continue to play to try and trigger the corresponding free spin feature game to try and win such an accumulated equity.

As a result, at least one technical improvement of the systems and methods described herein is that a player may be more invested in a gaming session as free games are accumulated. Likewise, as the player's perceived equity in the gaming session increases, the player may additionally wish to continue gameplay until, at least, a feature game is triggered and one or more accumulated free games or free spins are utilized.

FIG. 4 illustrates an example of a set 400 of five reel strips 421, 422, 423, 424, 425. In the example, each reel strip has fifteen reel strip positions 401-415. Each reel strip position of each reel has a symbol. For example, a "Wild" symbol 431 occupies the sixth reel strip position 406 of the fourth reel 424. Other reels strips to those illustrated in FIG. 4 can be used, for example, reel strips where two or more wild symbols are placed at consecutive reel strip positions of a reel strip. In other examples, the reel strips could have between 30 and 100 reel strip positions. The actual length of the feature game reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

In this example, the reel strips also include free game accumulation symbols 432, 433, 434, 435 that cause a free game to be added when a free game accumulation symbol 432, 433, 434, 435 is selected and displayed, in this example in the fifth reel strip 425. Each free game accumulation symbol 432, 433, 434, 435 is associated with a particular jackpot—MINI, MAXI, MEGA and ULTRA—and therefore a particular free game meter. The reel strips also include jackpot trigger symbols 436 that cause a jackpot feature to commence when selected and displayed, in this example when jackpot trigger symbols are displayed in display positions of the first and third reel strips 421, 423 and a free game accumulation symbol 432, 433, 434, 435 is also displayed in the fifth reel strip 425.

Figure 5:
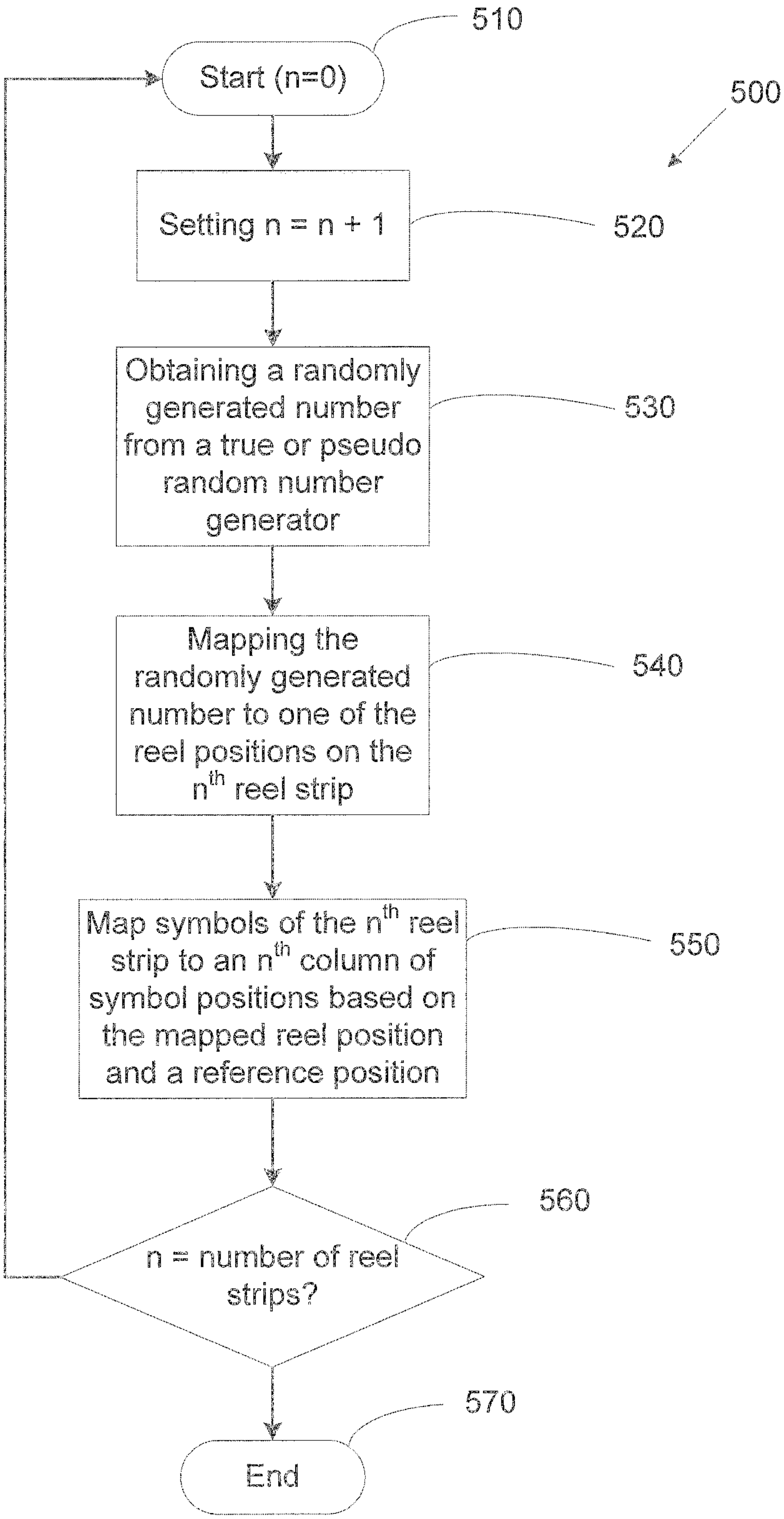
FIG. 5 is a flow chart of a symbol selection method.

FIG. 5 is a flow chart of a method 500 carried out by the processor 204 to select symbols from reel strips. At step 510, the processor 204 starts the process of selecting symbols with a counter (n) set at zero as symbols have not yet been selected from any reel strips. At step 520, the processor 204 increments the counter. In the first iteration, the counter is set to 1 to reflect that symbols are to be selected from a first reel strip. At step 530 the processor obtains a randomly generated number from a true or pseudo random number generator, such as RNG 212. At step 540 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 550, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 4, if the value returned by the RNG 212 is mapped to reel position 413, then for the first reel strip 421, "Pic3" symbol 443 is mapped to a bottom symbol position, "10" symbol 442 is mapped to a middle symbol position, and "J" symbol is mapped to a top symbol position.

At step 560, the processor 560 determines whether symbols have been selected for all of the reel strips, and if not the processor reverts to step 520 and iterates through steps 530, 540 and 550 until it is determined at step 560 that symbols have been selected from all n reel strips and mapped to all n columns of symbol positions after which the symbol selection process ends 570. Different numbers of symbols may be mapped to different numbers of symbol positions.

After the symbols of all reel strips have been mapped to symbol position, the processor 204 controls display 240 to display them at the symbol positions.

An example embodiment will now be described with reference to FIGS. 6 to 10 of the drawings.

Figure 6:
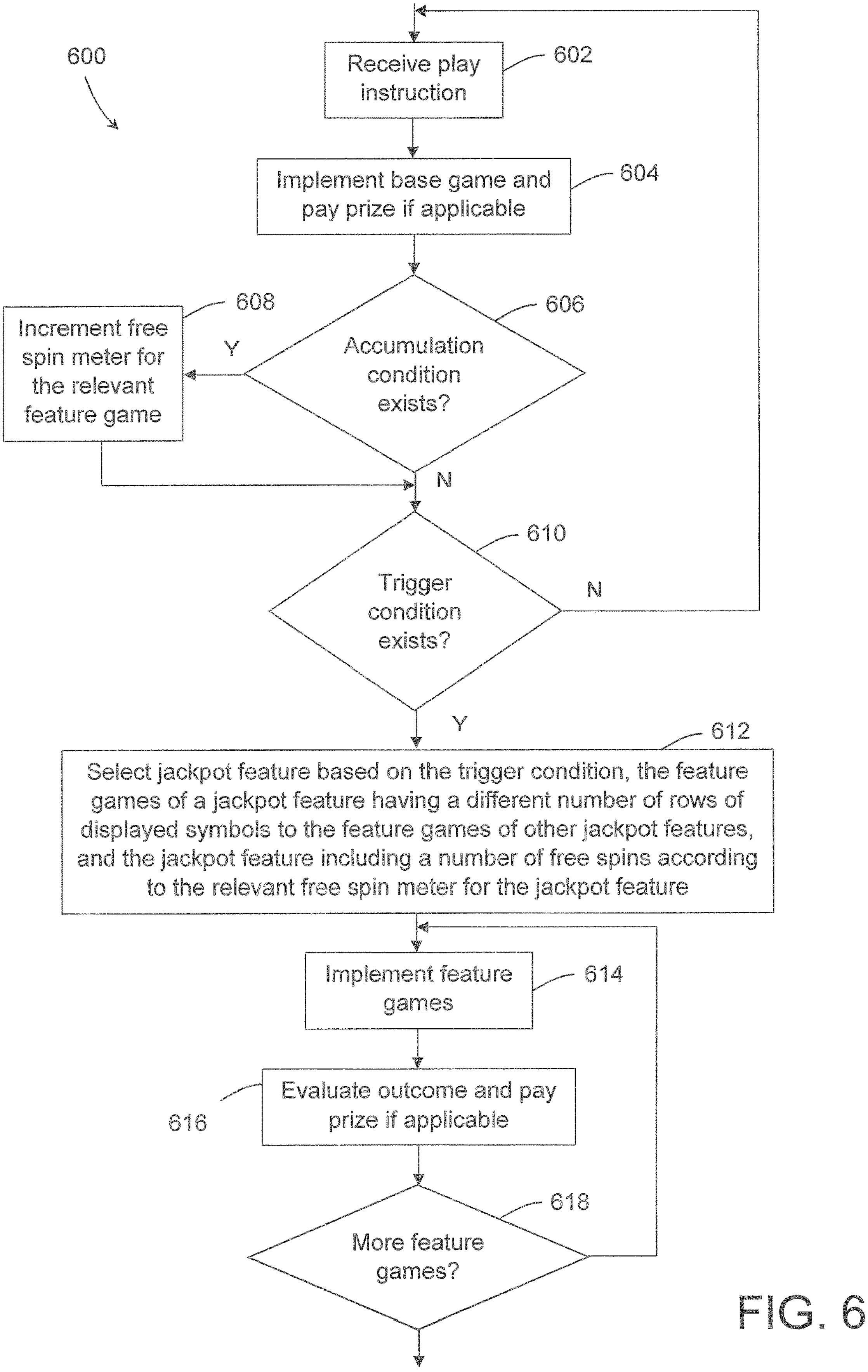
FIG. 6 is a flow chart illustrating an example game implementation.

FIG. 6 illustrates a flow chart 600 illustrating an example game implementation. In the illustrated example, on receipt of an initial game play instruction 602 from a player, a base game is implemented 604 that involves selection of symbols and display of the symbols in a display area, such as one described with reference to FIG. 5. The selected and displayed symbols are used by the game controller 202 to determine a base game outcome and, if the base game outcome corresponds to a winning outcome, a prize to be awarded to the player.

Figure 7:
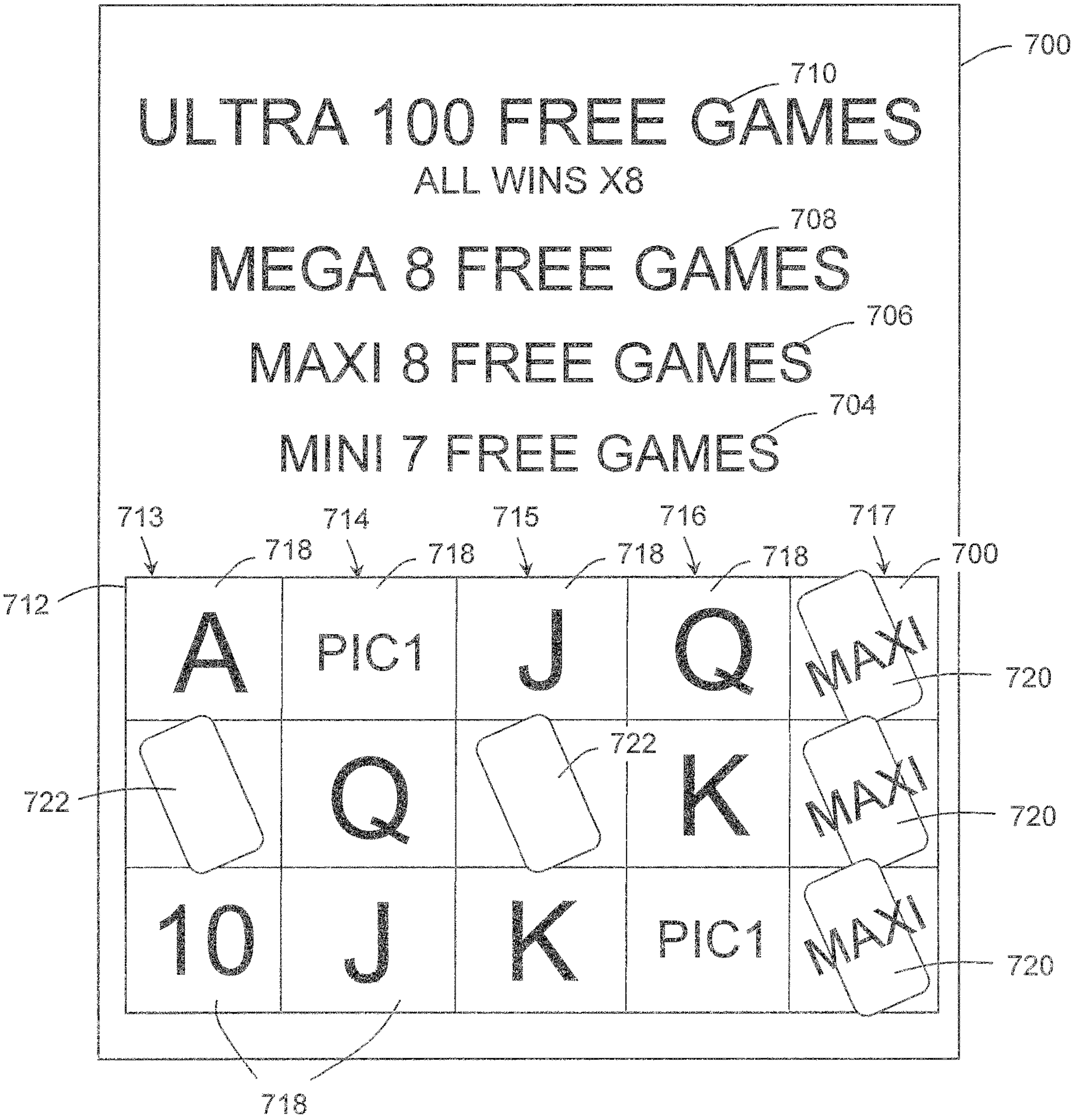
FIG. 7 illustrates an example screen displayed to a player during implementation of a base game.

An example representation 700 of indicia displayed to the player during a base game is shown in FIG. 7. The representation 700 includes indicia 702 indicative of the available jackpot features, in this example a MINI jackpot feature 704, a MAXI jackpot feature 706, a MEGA jackpot feature 708 and an ULTRA jackpot feature 710. Each of the jackpot features has an associated free game meter 314 that records a cumulative value for the number of free games available for the jackpot feature, in this example 7 free games for the MINI jackpot feature 704, 8 free games for the MAXI jackpot feature 706, 8 free games for the MEGA jackpot feature 708 and 100 free games for the ULTRA jackpot feature 710.

In an embodiment, the MINI, MAXI and MEGA jackpot features are of a type that accumulate free games based only on outcomes occurring at a single gaming device, and the ULTRA jackpot feature is of linked progressive type, wherein free games are accumulated based on outcomes occurring at multiple gaming devices and the jackpot is managed by the progressive system server 212.

Also shown in the representation 700 is a display area 712 arranged to display symbols selected from the reels 421, 422, 423, 424, 425 in respective first, second, third, fourth and fifth reel display positions 713, 714, 715, 716, 717. The symbols include standard symbols 718, free game accumulation symbols 720, and jackpot feature trigger symbols 722.

In addition to making a determination in relation to whether the selected and displayed symbols correspond to a winning game outcome, a determination 606 is also made by the accumulation condition determiner 328 of the game controller 202 as to whether the selected and displayed symbols correspond to an accumulation condition. The accumulation condition in this example is selection and display of at least one accumulation symbol 720 in any display position 717 of the fifth reel 425. When an accumulation condition is considered to exist, at least one free game is added 608 to the relevant free game meter 314 by the free game meter incrementor 330. In this example, each jackpot feature has a different accumulation symbol 720 such that selection and display of an accumulation symbol 720 causes at least one free game to be added to a free game meter 314 of a specific jackpot feature. Multiple displayed accumulation symbols 720 cause multiple free games to be added to multiple free game meters or multiple free games to be added to the same free game meter. In this example shown in FIG. 7, 3 MAXI accumulation symbols 720 are displayed in the display positions 717 of the fifth reel 425 and accordingly, 3 free games are added to the free game meter 314 associated with the MAXI jackpot feature.

The game controller 202 also makes a determination 610 as to whether the selected and displayed symbols correspond to a trigger condition. If no trigger condition exists, the player is able to provide a further play instruction 602 in order to commence a new base game. If a trigger condition exists, the game controller 202 selects 612 the jackpot feature corresponding to the trigger condition and implements 614 the jackpot feature by providing the player with a display area 712 having a defined number of rows, and providing the player with the number of free games currently recorded in the relevant free game meter 314 for the jackpot feature. In this example, a jackpot feature is triggered by selection and display of jackpot feature trigger symbols 722 in the display positions 713, 715 of the first and third reels 421, 423, and selection and display of an accumulation symbol 720 in the display positions 717 of the fifth reel 425. The type of jackpot is determined according to the type of accumulation symbol 720 displayed in the display positions 717 of the fifth reel 425.

In this example, each jackpot feature provides a different number of rows in the display area 712, with the number of rows progressively increasing from the MINI jackpot feature, the MAXI jackpot feature, the MEGA jackpot feature and the ULTRA jackpot feature. The number of rows may be predefined, such as 3 for MINI, 4 for MAXI, 5 for MEGA and 10 for ULTRA. However, it will be understood that other implementations are envisaged. For example, the numbers of rows may be determined according to a formula, such as:

$$W=3$$

where W is the number of rows in a MINI jackpot feature.

$$X=a$$

where X is the number of rows in a MAXI jackpot feature, and a is a randomly generated or pseudo randomly generated integer greater than W and less than a defined limit, such as 10.

$$Y=X+N1$$

Where Y is the number of rows in a MEGA jackpot feature, N1 is an integer and N1>0.

$$Z=X+N2$$

Where Z is the number of rows in a ULTRA jackpot feature, N2 is an integer, and N2>0, and N2>N1.

With this formula, if a is 5, N1 is 2 and N2 is 10, then a MINI jackpot feature will have 3 rows, a MAXI jackpot feature will have 5 rows, a MEGA jackpot feature will have 7 rows and an ULTRA jackpot feature will have 15 rows.

The number of rows to use in a jackpot feature may be determined prior to commencement of the jackpot feature and used in all free games provided in the jackpot feature, or the number of rows may be variable such that some free games provided in the jackpot feature have different numbers of rows. For example, a defined number of the provided free games (e.g. the first 15 of 20 free games) may use a first number of rows (e.g. Z) and the remaining number of the provided free games (e.g. the subsequent 5 of the 20 free games) may use an increased number of rows (e.g. Z+N3, where N3>1) as a “super” free game.

Figure 8:
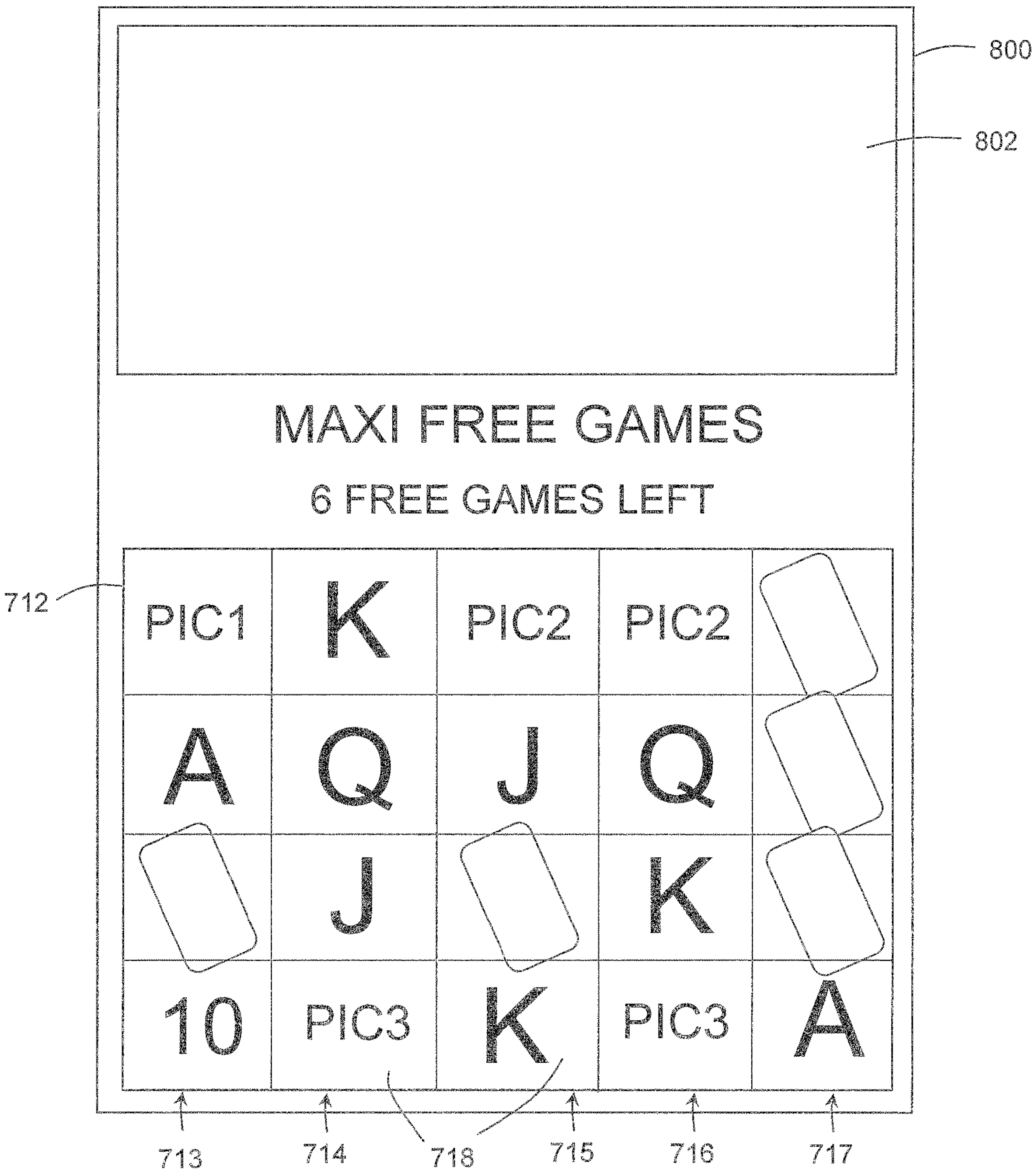
FIG. 8 illustrates an example screen displayed to a player during implementation of a first feature game.

An example representation 800 of game indicia displayed to the player during a MAXI jackpot game is shown in FIG. 8. Like and similar features are indicated with like reference numerals. In this example, the MAXI jackpot feature includes 1 additional row compared to the MINI jackpot feature.

Figure 9:
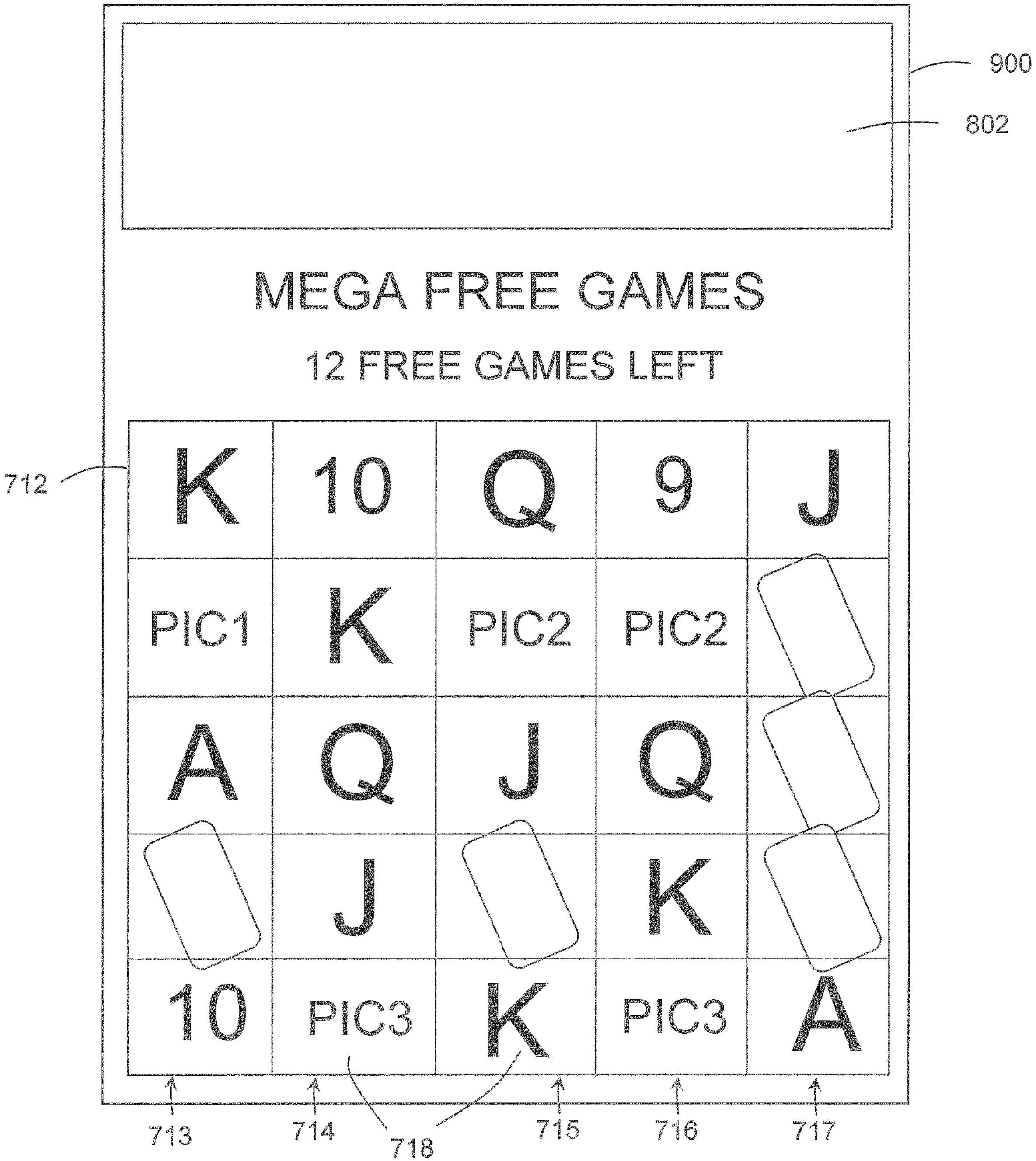
FIG. 9 illustrates an example screen displayed to a player during implementation of a second feature game.

An example representation 900 of game indicia displayed to the player during a MEGA jackpot game is shown in FIG. 9. Like and similar features are indicated with like reference numerals. In this example, the MEGA jackpot feature includes 1 additional row compared to the MAXI jackpot feature shown in FIG. 8.

Figure 10:
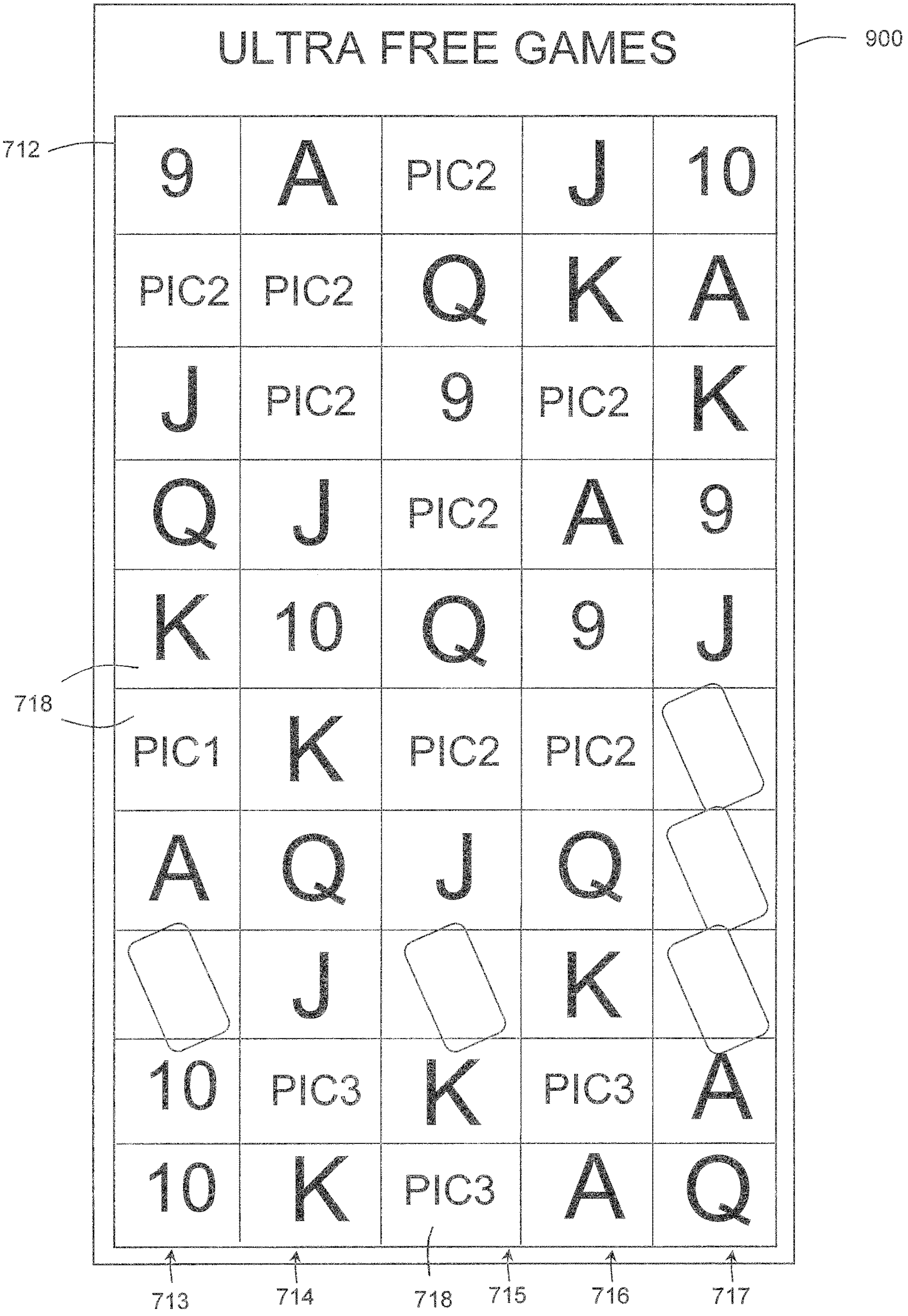
FIG. 10 illustrates an example screen displayed to a player during implementation of a third feature game.

An example representation 1000 of game indicia displayed to the player during an ULTRA jackpot game is shown in FIG. 10. Like and similar features are indicated with like reference numerals. In this example, the ULTRA jackpot feature includes 5 additional rows compared to the MEGA jackpot feature shown in FIG. 9.

As shown, it will be appreciated that as the number of rows increases, an area 802 of the display typically used to display game related images reduces in size.

It will be understood that in addition to modifying the number of rows according to the type of jackpot feature that is triggered, the system may be arranged to modify other aspects of operation. For example:

- the number of symbol positions in a row may be increased;
- additional symbol display areas may be added such that multiple feature games occur simultaneously;
- the number of available function symbols, such as Wild symbols, may be increased;
- multiplier symbols may be added or multiplier values associated with existing multiplier symbols modified;
- the set of symbols associated with the reel strips may be modified, for example so as to replace a defined type of symbol (such as royal or standard symbols) with defined other symbols;
- the set of symbols associated with the reel strips may be modified so as to include stacks of symbols;
- the set of symbols associated with the reel strips may be modified so as to add instant win symbols;
- the system may be modified so that respins are awarded based on a defined outcome in a feature game;
- the system may be modified so that sticky wild symbols are added, for example based on the level of the feature game, the length of time since the feature was last triggered, or based on a number of Wild symbols that have appeared in one or more base games; and/or
- the system may be modified so that at least one symbol covers multiple display positions across multiple columns and/or multiple rows, with the enlarged symbol being optionally persistent.

Such modifications may be applied to specific jackpot features, for example only to the ULTRA jackpot feature.

In an embodiment, a gaming system is provided that comprises:

a base game implementer arranged to implement a base game having a defined number of rows of displayed symbols;

at least one free game meter arranged to record a free game value indicative of the number of free games available in a feature game;

an accumulation condition determiner arranged to determine whether an accumulation condition exists in an outcome of a base game;

a free game meter incrementor arranged to increment a free game meter by at least one free game when the accumulation condition determiner determines that an accumulation condition exists in an outcome of the base game;

a trigger condition determiner arranged to cause the gaming system to implement a feature game of a plurality of feature games when a feature trigger condition exists in an outcome of the base game;

wherein at least one feature game includes in a free game of the feature game a number of symbol rows that is at least one symbol row more than the number of symbol rows of the base game and at least one symbol row more than the number of symbol rows of a free game of another feature game.

In an embodiment, a free game of each feature game includes a different number of symbol rows than a free game of each other feature game.

In an embodiment, the number of symbol rows in a free game of a feature game increases with increasing level of feature game.

In an embodiment, each feature game has an associated different free game meter.

In an embodiment, the accumulation condition comprises display of at least one defined symbol in an outcome of the base game.

In an embodiment, the accumulation condition comprises display of at least one defined symbol in at least one defined region of the displayed symbols in the outcome of the base game.

In an embodiment, the free game meter incrementor is arranged to increment at least one free game meter when the accumulation condition determiner determines that multiple accumulation conditions exists in an outcome of the base game.

In an embodiment, the base game includes a plurality of different accumulation symbols and each free game meter is associated with a different accumulation condition such that occurrence of a defined accumulation condition causes a defined free game meter to be incremented.

In an embodiment, at least one feature game is of linked progressive type whereby a plurality of gaming devices are associated with the feature game such that at least one free game meter is arranged to increment based on outcomes base games implemented by the plurality of gaming devices.

In an embodiment, the feature trigger condition comprises display of at least one defined symbol in an outcome of the base game.

In an embodiment, the feature trigger condition comprises display of at least one defined trigger symbol in at least one defined region of the displayed symbols in the outcome of the base game.

In an embodiment, the feature trigger condition comprises display of a plurality of defined trigger symbols in a respective plurality of defined regions of the displayed symbols in the outcome of the base game.

In an embodiment, the feature trigger condition comprises display of at least one defined trigger symbol in at least one respective defined region of the displayed symbols in the outcome of the base game and display of an accumulation symbol in a different defined region of the displayed symbols in the outcome of the base game.

In an embodiment, the feature game to be implemented by the feature game implementer is selected based on the accumulation symbol displayed during the base game.

In an embodiment, the number of symbol rows in a free game of a feature game is predefined.

In an embodiment, the number of symbol rows in a free game of a feature game is determined based on a formula dependent on at least one term that is randomly or pseudo randomly generated.

In an embodiment, the number of symbol rows in a free game is dependent on the implemented free game.

In an embodiment, for a defined feature game the system is arranged to vary the number of symbol rows in at least one free game of the feature game such that at least one free game has a different number of symbol rows than at least one other free game of the feature game.

In an embodiment, for a defined feature game at least one first free game of the feature game has a first number of symbol rows and a subsequent at least one second free game of the feature game has a second number of symbol rows, the first number of symbol rows different to the second number of symbol rows.

In an embodiment, functionality of a free game of a feature game is dependent on the feature game such that an award magnitude or a likelihood of obtaining a winning outcome is higher for a defined feature game than for other feature games.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

at least one memory storing instructions and a plurality of free game meters; and at least one processor in communication with the at least one memory, wherein the instructions, when executed by the at least one processor, cause the at least one processor to:

cause display of a base game that includes a randomized game outcome for a plurality of symbol positions based at least in part on one or more reel strips including a plurality of symbols, the plurality of symbols including a plurality of types of free game accumulation symbols;

cause display of at least one of the free game accumulation symbols as part of the randomized game outcome, wherein display of the at least one of the free game accumulation symbols satisfies an accumulation condition; and in response to the accumulation condition being satisfied, increment at least one free game meter of the plurality of free game meters, the plurality of free game meters being persistent in the at least one memory between game play instances of the base game, wherein each free game meter of the plurality of free game meters is associated with one feature game of a plurality of feature games and a type of free game accumulation symbol of the plurality of types of free game accumulation symbols, each free game meter being only incremented in response to the randomized game outcome including the associated type of free game accumulation symbol, and wherein each free game meter stores a number of free games that will be awarded when the feature game associated with the free game meter is triggered from the base game.

2. The electronic gaming system of claim 1, wherein the instructions, when executed, further cause the at least one processor to:

cause display of each of the plurality of free game meters during play of the base game by accessing the at least one memory to provide a visual indication of a respective number of accumulated free games for each feature game.

3. The electronic gaming system of claim 2, wherein the instructions, when executed, further cause the at least one processor to:

cause display of at least one feature game of the plurality of feature games, wherein each feature game is associated with a respective number of rows that is different than a first number of rows associated with the base game.

4. The electronic gaming system of claim 3, wherein the randomized game outcome is determined based in part on a first output of a random number generator (RNG), and wherein the instructions, when executed, further cause the at least one processor to:

cause display of a first feature game is in response to the randomized game outcome including a first type of the free game accumulation symbols; and cause display of a second number of rows for play of the first feature game, wherein the second number of rows is determined based on a second output of the RNG.

5. The electronic gaming system of claim 1, wherein the instructions, when executed, further cause the at least one processor to:

in response to a feature trigger condition being satisfied, cause display of at least one feature game of the plurality of feature games, the at least one feature game including the number of free games shown in the free game meter associated with the at least one feature game;

and cause display of a feature game award associated with the at least one feature game, wherein the feature game award is based on outcomes of each free game of the awarded number of free games.

6. The electronic gaming system of claim 1, wherein the instructions, when executed, further cause the at least one processor to:

cause display, during each feature game of the plurality of feature games, of a respective number of rows, wherein each feature game is associated with a different number of rows from each other feature game.

7. The electronic gaming system of claim 6, wherein the plurality of feature games are organized in levels, and wherein the respective number of rows displayed during each feature game changes depending upon the level associated with the feature game.

8. The electronic gaming system of claim 1, wherein the instructions, when executed, further cause the at least one processor to:

increment the at least one free game meter by a number of free games corresponding to a number of free game accumulation symbols displayed during the base game.

9. The electronic gaming system of claim 1, wherein the plurality of symbols provided on the one or more reel strips include a jackpot trigger symbol, and wherein the instructions, when executed, further cause the at least one processor to:

cause display of the jackpot trigger symbol as part of the randomized game outcome of the base game, wherein the randomized game outcome including the jackpot trigger symbol and the at least one of the free game accumulation symbols satisfies a feature trigger condition; and in response to the feature trigger condition being satisfied, cause display of the feature game associated with the at least one of the free game accumulation symbols, wherein play of the feature game includes the number of free games shown in the free game meter associated with the feature game.

10. The electronic gaming system of claim 1, wherein the plurality of types of free game accumulation symbols include a first free game symbol type and a second free game symbol type, and wherein the instructions, when executed, further cause the at least one processor to:

increment a first free game meter associated with a first feature game in response to the randomized game outcome of the base game including the first free game symbol type; and increment a second free game meter associated with a second feature game in response to the base randomized game outcome including the second free game symbol type.

11. The electronic gaming system of claim 1 further comprising a display device in communication with the at least one processor, wherein the display of the base game is provided on the display device, and wherein the display device is provided on a mobile gaming device including at least one of a smart phone, a tablet, a laptop, and a game console.

12. A method of providing an electronic game comprising:

storing a plurality of free game meters in at least one memory, each free game meter of the plurality of free game meters being associated with one feature game of a plurality of feature games and one type of free game accumulation symbol of a plurality of types of free game accumulation symbols, the plurality of free game meters being persistent in the at least one memory between game play instances of a base game and each storing a number of free games that will be awarded when the feature game associated with the free game meter is triggered from the base game;

causing display of a randomized game outcome of the base game, the randomized game outcome including a plurality of symbols from one or more reel strips being positioned in a plurality of symbol positions, the one or more reel strips including the plurality of types of free game accumulation symbols;

causing display of at least one of the free game accumulation symbols as part of the randomized game outcome, wherein display of the at least one of the free game accumulation symbols satisfies an accumulation condition; and incrementing, in response to the accumulation condition being satisfied, at least one free game meter of the plurality of free game meters, wherein each free game meter is only incremented in response to the randomized game outcome including the associated type of free game accumulation symbol.

13. The method of claim 12 further comprising:

causing display of each of the plurality of free game meters during play of the base game by accessing the at least one memory to provide a visual indication of a respective number of accumulated free games for each feature game.

14. The method of claim 13 further comprising:

causing display of at least one feature game of the plurality of feature games, wherein each feature game is associated with a respective number of rows that is different than a first number of rows associated with the base game.

15. The method of claim 14, wherein the randomized game outcome is determined based in part on a first output of a random number generator (RNG), the method further comprising:

causing display of a first feature game in response to the randomized game outcome including a first type of the free game accumulation symbols; and causing display of a second number of rows for play of the first feature game, wherein the second number of rows is determined based on a second output of the RNG.

16. The method of claim 12, wherein the display of the base game is provided on a display of a mobile gaming device, the mobile gaming device including at least one of a smart phone, a tablet, a laptop, and a game console.

17. At least one non-transitory computer-readable storage medium with instructions stored thereon that, in response to execution by at least one processor, cause the at least one processor to:

cause display of a base game that includes a randomized game outcome for a plurality of symbol positions based at least in part on one or more reel strips including a plurality of symbols, the plurality of symbols including a plurality of types of free game accumulation symbols;

cause display of at least one of the free game accumulation symbols as part of the randomized game outcome, wherein display of the at least one of the free game accumulation symbols satisfies an accumulation condition; and in response to the accumulation condition being satisfied, increment at least one free game meter of a plurality of free game meters, the plurality of free game meters being persistent between game play instances of the base game, wherein each free game meter of the plurality of free game meters is associated with one feature game of a plurality of feature games and one type of free game accumulation symbol of the plurality of types of free game accumulation symbols, each free game meter being only incremented in response to the randomized game outcome including the associated type of free game accumulation symbol, and wherein each free game meter stores a number of free games that will be awarded when the feature game associated with the free game meter is triggered from the base game.

18. The at least one non-transitory computer-readable storage medium of claim 17, wherein the instructions further cause the at least one processor to:

cause display of each of the plurality of free game meters during play of the base game to provide a visual indication of a respective number of accumulated free games for each feature game.

19. The at least one non-transitory computer-readable storage medium of claim 17, wherein the instructions, when executed, further cause the at least one processor to:

cause display of at least one feature game of the plurality of feature games, wherein each feature game is associated with a respective number of rows that is different than a first number of rows associated with the base game.

20. The at least one non-transitory computer-readable storage medium of claim 17, wherein the display of the base game is provided on a display of a mobile gaming device, the mobile gaming device including at least one of a smart phone, a tablet, a laptop, and a game console.

* * * * *